(12) United States Patent
Ushida et al.

(10) Patent No.: US 11,043,863 B2
(45) Date of Patent: Jun. 22, 2021

(54) ROTOR MANUFACTURING METHOD

(71) Applicant: AISIN AW CO., LTD., Anjo (JP)

(72) Inventors: Hideharu Ushida, Anjo (JP); Tetsuya Matsubara, Anjo (JP); Tetsuya Takahashi, Anjo (JP); Shinya Katayama, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 501 days.

(21) Appl. No.: 16/080,391

(22) PCT Filed: Mar. 31, 2017

(86) PCT No.: PCT/JP2017/013765
§ 371 (c)(1),
(2) Date: Aug. 28, 2018

(87) PCT Pub. No.: WO2017/171061
PCT Pub. Date: Oct. 5, 2017

(65) Prior Publication Data
US 2019/0074740 A1 Mar. 7, 2019

(30) Foreign Application Priority Data

Mar. 31, 2016 (JP) .............................. JP2016-072426
Aug. 31, 2016 (JP) ................................. 2016-170149

(51) Int. Cl.
*H02K 1/28* (2006.01)
*H02K 15/03* (2006.01)
(Continued)

(52) U.S. Cl.
CPC .............. *H02K 1/28* (2013.01); *H02K 1/274* (2013.01); *H02K 1/276* (2013.01); *H02K 15/03* (2013.01); *H02K 15/12* (2013.01); *Y02T 10/64* (2013.01)

(58) Field of Classification Search
CPC ........... H02K 1/28; H02K 1/274; H02K 15/12
(Continued)

(56) References Cited

U.S. PATENT DOCUMENTS 6,329,734 B1  12/2001  Takahashi et al.
9,484,790 B2  11/2016  Takahashi et al.
(Continued)

FOREIGN PATENT DOCUMENTS

JP   H07-194073 A   7/1995
JP   2001-169485 A  6/2001
(Continued)

OTHER PUBLICATIONS

Jun. 13, 2017 International Search Report issued in International Patent Application No. PCT/JP2017/013765.
(Continued)

*Primary Examiner* — Terrance L Kenerly
(74) *Attorney, Agent, or Firm* — Oliff PLC

(57) ABSTRACT

A method of manufacturing a rotor includes: applying the adhesive to an adhesive placement position on an outer peripheral surface of the permanent magnet or an inner peripheral surface of the magnet hole, the adhesive containing an expansive agent that is expanded by being heated to a temperature that is equal to or higher than an expansion temperature; drying the adhesive after applying the adhesive; inserting the permanent magnet into the magnet hole of the rotor core after drying the adhesive; and fixing the permanent magnet and the rotor core to each other using the adhesive by expanding the expansive agent and curing the adhesive by heating the adhesive to a temperature that is equal to or higher than the expansion temperature after inserting the permanent magnet.

20 Claims, 9 Drawing Sheets

(51) Int. Cl.
*H02K 15/12* (2006.01)
*H02K 1/27* (2006.01)

(58) Field of Classification Search
USPC .................................. 310/156.08, 156.53
See application file for complete search history.

(56) References Cited

U.S. PATENT DOCUMENTS

| | | |
|---|---|---|
| 2006/0103253 A1 | 5/2006 | Shiga et al. |
| 2007/0205686 A1 | 9/2007 | Ishida |
| 2013/0032090 A1 | 2/2013 | Yano |
| 2016/0261158 A1 | 9/2016 | Horii et al. |

FOREIGN PATENT DOCUMENTS

| | | |
|---|---|---|
| JP | 2005-312259 A | 11/2005 |
| JP | 2007-060836 A | 3/2007 |
| JP | 2007-151362 A | 6/2007 |
| JP | 2013-031805 A | 2/2013 |
| JP | 2013-066345 A | 4/2013 |
| JP | 2015-050856 A | 3/2015 |
| JP | 2015-055062 A | 3/2015 |
| JP | 2015-173748 A | 10/2015 |
| WO | 2007/007420 A1 | 1/2007 |
| WO | 2015/087445 A1 | 6/2015 |

OTHER PUBLICATIONS

May 16, 2017 International Search Report issued in International Patent Application No. PCT/JP2017/013528.
U.S. Appl. No. 16/080,814, filed Aug. 29, 2018 in the name of Shinya Katayama.
Feb. 27, 2020 Notice of Allowance issued in U.S. Appl. No. 16/080,814.
Nov. 4, 2019 Office Action issued in U.S. Appl. No. 16/080,814.

ROTOR MANUFACTURING METHOD

BACKGROUND

The present disclosure relates to a rotor manufacturing method.

There has hitherto been known a rotor manufacturing method in which a permanent magnet is inserted into a magnet hole portion of a rotor core. Such a rotor manufacturing method is disclosed in Japanese Patent Application Publication No. 2007-151362 (JP 2007-151362 A), for example.

JP 2007-151362 A discloses a permanent magnet fixing method in which a permanent magnet is inserted into an accommodation groove of a rotor core to be accommodated therein. In the permanent magnet fixing method, first, an adhesive sheet that has been formed into a sheet shape separately from the permanent magnet is affixed to the surface of the permanent magnet, or a molten adhesive is dropped thereto, so that the adhesive (or adhesive sheet) which contains a foaming agent that is foamed when heated is placed on such a surface. The adhesive or the adhesive sheet will be referred to as an "adhesive material". After that, the adhesive material is shaped by a pressing machine in order to position the adhesive material with respect to the permanent magnet to be fixed. At this time, the adhesive material is shaped such that the surface of the adhesive material is smoothed by the pressing machine pressing the adhesive material using a mold while heating the adhesive material to be cured. In this process, the adhesive material, which is placed on the surface of the permanent magnet, is not foamed. After that, the permanent magnet is inserted into the accommodation groove of the rotor core. After that, when the adhesive material is heated, the foaming agent is foamed to expand the adhesive material, and the rotor core and the permanent magnet are fixed to each other by the expanded adhesive material.

SUMMARY

In the permanent magnet fixing method described in JP 2007-151362 A, however, the adhesive sheet is placed on the permanent magnet by affixing the adhesive sheet, which has been formed into a sheet shape separately from the permanent magnet, to the surface of the permanent magnet. That is, the adhesive sheet is used to fix the rotor core and the permanent magnet to each other, and therefore a step of forming the adhesive sheet is required separately from a step of affixing the adhesive sheet. Therefore, the permanent magnet fixing method described in JP 2007-151362 A disadvantageously increases the number of steps of the rotor manufacturing method. Since the adhesive sheet is formed so as to be comparatively thin, in addition, it may be difficult to shape the adhesive sheet, which has already been formed into a sheet shape, using a mold, and it may be difficult to affix the adhesive sheet, which has been formed so as to be thin, to the permanent magnet. That is, in the case where the adhesive sheet is used in the permanent magnet fixing method described in JP 2007-151362 A, it may be disadvantageously difficult to form the adhesive sheet so as to be comparatively thin, and to affix the adhesive sheet to the permanent magnet.

Thus, it is conceivable to apply a molten adhesive to the permanent magnet, rather than using the adhesive sheet. In the permanent magnet fixing method described in JP 2007-151362 A, in order to position the adhesive with respect to the permanent magnet to be fixed, a molten adhesive is placed on the surface of the permanent magnet, and thereafter the surface of the adhesive is pressed so as to be smoothed by the pressing machine using a mold. In this method, however, the adhesive which has been pressed by the mold during pressing may be exuded to (leaked into) a position at which the mold and the permanent magnet should abut against each other (a position at which the adhesive should not be placed), or exuded out of the mold through a gap between the mold and the permanent magnet, which disadvantageously makes it difficult to control the position at which the adhesive is placed (adhesive placement position). Thus, with the permanent magnet fixing method (rotor manufacturing method) described in JP 2007-151362 A, the adhesive may be applied to a position other than the desired placement position (adhesive placement position), and therefore the adhesive that is cured after the insertion of the magnet may be exuded from an axial end surface of the rotor core.

An exemplary aspect of the disclosure provides a rotor manufacturing method that prevents the adhesive from being applied to a position other than an adhesive placement position, and that enables an adhesive to be positioned with respect to a permanent magnet or a rotor core to be fixed.

An aspect of the present disclosure provides a method of manufacturing a rotor that includes a rotor core having a magnet hole, and a permanent magnet inserted into the magnet hole and fixed to the rotor core using an adhesive, the method includes: applying the adhesive to an adhesive placement position on an outer peripheral surface of the permanent magnet or an inner peripheral surface of the magnet hole, the adhesive containing an expansive agent that is expanded by being heated to a temperature that is equal to or higher than an expansion temperature; drying the adhesive after applying the adhesive; inserting the permanent magnet into the magnet hole of the rotor core after drying the adhesive; and fixing the permanent magnet and the rotor core to each other using the adhesive by expanding the expansive agent and curing the adhesive by heating the adhesive to a temperature that is equal to or higher than the expansion temperature after inserting the permanent magnet. Herein, the phrase "apply an adhesive" is used to mean a wide concept including not only applying the adhesive using a nozzle or the like but also applying the adhesive through stamping (transfer) using a stamp or the like. In addition, the term "permanent magnet" is used to mean a wide concept including not only a magnet after being magnetized but also a magnet before being magnetized.

With the rotor manufacturing method according to the aspect of the present disclosure, the adhesive can be positioned at the adhesive placement position to be fixed without using a pressing machine or a mold for molding an adhesive. As a result, the adhesive can be prevented from adhering to a position other than the adhesive placement position when the adhesive is fixed to the adhesive placement position. That is, the adhesive is not exuded to (leaked into) a position at which the mold and the permanent magnet or the rotor core should abut against each other (a position other than the adhesive placement position), or the adhesive is not exuded out of the mold (on the outer side with respect to the adhesive placement position) through a gap between the mold and the permanent magnet or the rotor core. For example, the adhesive may not be exuded from an axial end surface of the rotor core because the adhesive adheres to a position other than the adhesive placement position (desired placement position). In addition, the adhesive is formed into a thin film when the adhesive is dried. Thus, interference between the adhesive and a wall surface of the magnet hole can be prevented. As a result, the insertability of the permanent magnet into the magnet hole can be improved. In addition, the adhesive is applied to the permanent magnet or the rotor core. Thus, unlike a case where an adhesive sheet is used, a step of forming an adhesive sheet is not required, which can prevent an increase in the number of steps of the rotor manufacturing method, and can prevent it from becoming difficult to place the adhesive on the permanent magnet or the rotor core.

According to the present disclosure, as described above, an adhesive can be positioned with respect to a permanent magnet or a rotor core to be fixed while the adhesive is prevented from adhering to a position other than an adhesive placement position.

DETAILED DESCRIPTION OF EMBODIMENTS

Embodiments of the present disclosure will be described below with reference to the drawings.

[Structure of Rotor According to First Embodiment]

The structure of a rotor 100 according to a first embodiment will be described with reference to FIGS. 1 to 8.

The term "rotary electric machine" as used herein refers to any of a motor (electric motor), a generator (electric generator), and a motor generator that functions both as a motor and as a generator as necessary. For example, a rotary electric machine 101 is configured as a travel motor for use in a hybrid vehicle or an electric vehicle.

Figure 1:
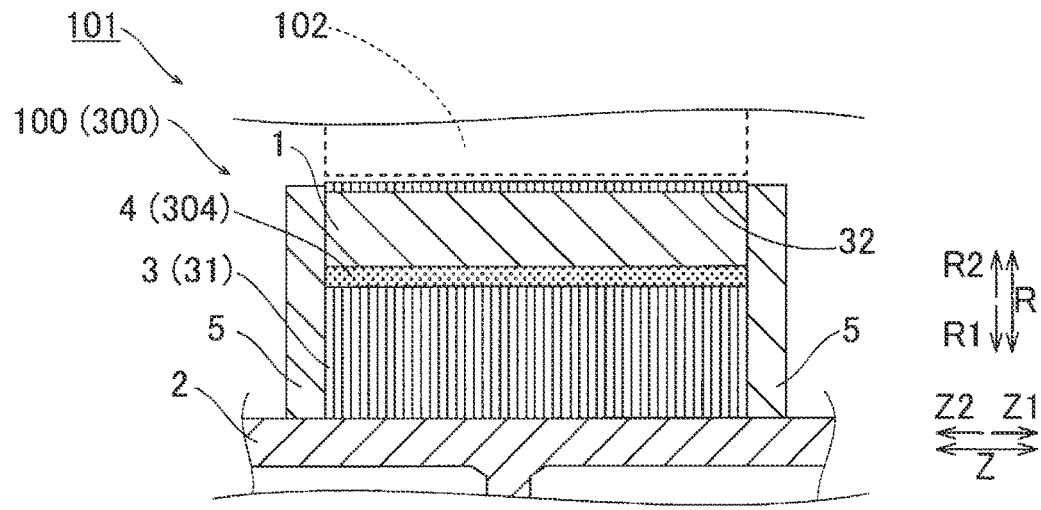
FIG. 1 is a sectional view of a rotary electric machine (rotor) according to a first embodiment of the present disclosure.

The terms "rotor rotational axis direction" and "axial direction" as used herein mean the direction of the rotational axis of the rotor 100 (a direction along an axis C1 (see FIG. 2); a direction that is parallel to the Z axis in FIG. 1). In addition, the term "circumferential direction" means the circumferential direction of the rotor 100 (the direction of an arrow A1 or the direction of an arrow A2 in FIG. 2). The term "radial direction" means the radial direction of the rotor 100 (the direction of an arrow R1 or the direction of an arrow R2 in FIG. 1). In addition, the term "radially inner side" means the radially inner side of the rotor 100 (side in the direction of the arrow R1), and the term "radially outer side" means the radially outer side of the rotor 100 (side in the direction of the arrow R2).

(Overall Structure of Rotor)

As illustrated in FIG. 1, the rotor 100 constitutes a part of an interior permanent magnet (IPM) motor (a part of the rotary electric machine 101) in which a plurality of permanent magnets 1 are embedded inside the rotor 100, for example.

The rotor 100 is disposed on the radially inner side of a stator 102 so as to face the stator 102 in the radial direction. That is, the rotary electric machine 101 is constituted as a rotary electric machine of an inner rotor type. The rotary electric machine 101 is configured such that the stator 102 is provided with a coil (not illustrated) and the rotor 100 makes rotational motion through interaction between a magnetic field (magnetic flux) generated by the coil and a magnetic field (magnetic flux) generated by the rotor 100 which faces the stator 102. As illustrated in FIG. 1, the rotor 100 includes the permanent magnet 1, a hub member 2, a rotor core 3, an adhesive 4, and end plates 5. The rotor 100 is fixed to the hub member 2 which is connected to a shaft, and configured to transfer rotational motion to (or receive rotational motion transferred from) the outside of the rotary electric machine 101 via the hub member 2 and the shaft. The stator 102 is fixed to a case (not illustrated) of the rotary electric machine 101.

The permanent magnets 1 are formed from neodymium magnets, for example. The neodymium magnets have a positive coefficient of thermal expansion in the magnetization direction (the direction of the arrow R1 and the direction of the arrow R2), and have a negative coefficient of thermal expansion in a direction that is perpendicular to the magnetization direction (the width direction of the permanent magnets 1 and a direction along the Z axis). The term "width direction of the permanent magnets 1" refers to a direction that is perpendicular to the Z axis and that is perpendicular to the magnetization direction.

Figure 3:
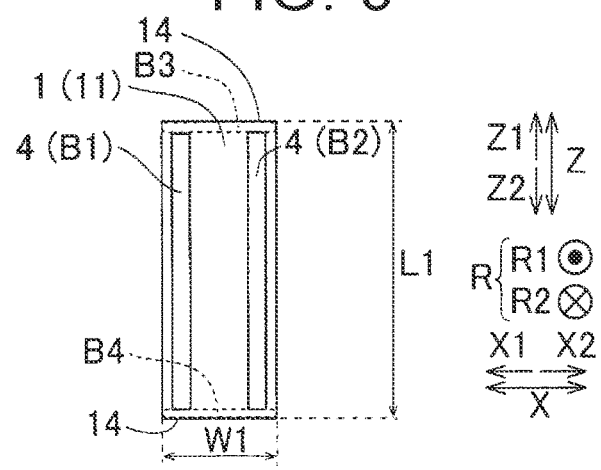
FIG. 3 is a side view illustrating the configuration of a permanent magnet and an adhesive of the rotor according to the first embodiment of the present disclosure.
Figure 4:
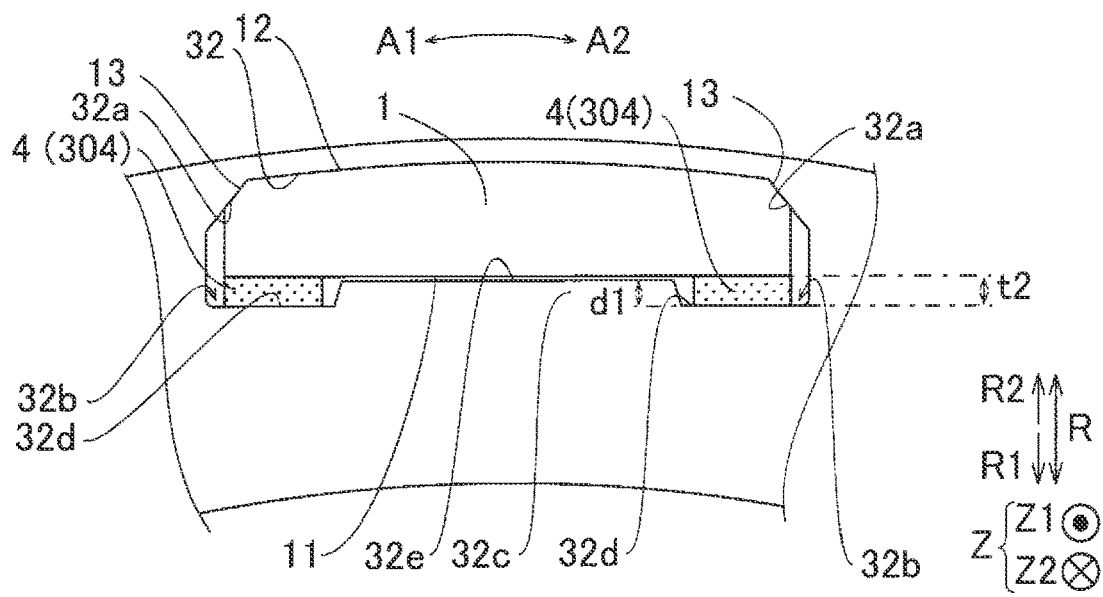
FIG. 4 is a partial plan view illustrating a state in which the permanent magnet and a rotor core of the rotor are bonded to each other by the adhesive according to the first embodiment of the present disclosure.

In addition, as illustrated in FIG. 3, the permanent magnet 1 is formed so as to have a generally rectangular shape that has a length L1 in the axial direction and a width W1 that is smaller than the length L1 as seen from the radially inner side. As illustrated in FIG. 4, the permanent magnet 1 has a generally rectangular shape in which two corner portions on the radially outer side are chamfered as seen from one side in the axial direction (as seen from the side in the direction of the arrow Z1). The permanent magnet 1 is configured such that a surface 11 on the radially inner side is a flat surface and a surface 12 on the radially outer side is an arcuate surface as seen from one side in the axial direction. The surface 11 is an example of the "outer peripheral surface of the permanent magnet" in the claims.

The two chamfered corner portions of the permanent magnet 1 are each provided with a surface 13 that serves as an abutment surface that abuts against a magnet hole portion 32 to be discussed later. The two surfaces 13 of the permanent magnet 1 are disposed so as to abut against (make surface contact with) wall surfaces 32a of the magnet hole portion 32. That is, the permanent magnet 1 is fixed as positioned by the pair of wall surfaces 32a which have a tapered shape as seen from the side in the direction of the arrow Z1.

As illustrated in FIG. 1, the hub member 2 is engaged with an engagement portion 3a (see FIG. 2) of the rotor core 3, which is disposed on the side in the direction of the arrow R2 with respect to the hub member 2, to be fixed to the rotor core 3. In addition, the hub member 2 is fixed to a shaft (not illustrated). The hub member 2, the rotor core 3, and the shaft are configured to rotate together with each other about an axis C1.

Figure 2:
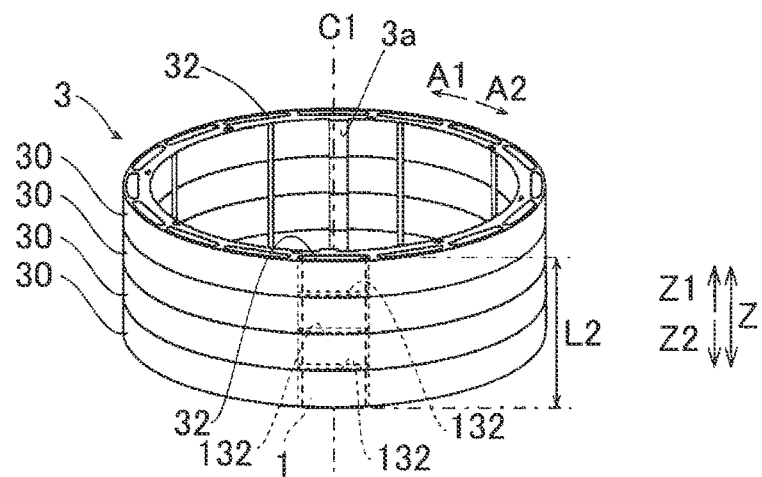
FIG. 2 is a perspective view of the rotor according to the first embodiment of the present disclosure.

As illustrated in FIG. 2, the rotor core 3 includes a plurality of (e.g. four) core blocks 30 that have a circular ring shape. The plurality of core blocks 30 are stacked on each other in the axial direction while sharing the center axis C1. The core blocks 30 are each formed by stacking a plurality of electromagnetic steel plates 31 (see FIG. 1; e.g. silicon steel plates) having a circular ring shape on each other in the axial direction.

As illustrated in FIG. 2, the core blocks 30 are each provided with a plurality of (e.g. 16) hole portions 132 constituted as through holes that extend along the axial direction. In addition, the plurality of core blocks 30 are stacked on each other in the axial direction such that the hole portions 132 overlap (or completely coincide with) each other in position as seen from the side in the direction of the arrow Z1. Consequently, the hole portions 132 of the plurality of core blocks 30 are connected so as to be continuous with each other in the rotor core 3, thereby forming the magnet hole portions 32 into which the permanent magnets 1 are inserted along the axial direction. In addition, as illustrated in FIG. 2, the plurality of magnet hole portions 32 are disposed circumferentially at equal angular intervals as seen from the side in the direction of the arrow Z1.

The permanent magnets 1 are disposed in the plurality of magnet hole portions 32. As illustrated in FIG. 1, the magnet hole portions 32 and the permanent magnets 1 are fixed (bonded) to each other by the adhesive 4. In addition, as illustrated in FIG. 2, a length L2 of the magnet hole portions 32 in the axial direction is slightly shorter than a length L1 of the permanent magnets 1 in the axial direction. The permanent magnets 1 are preferably not magnetized yet.

In addition, as illustrated in FIG. 4, the magnet hole portions 32 are each provided with two groove portions 32b, in each of which the adhesive 4 is placed and which are dented toward the radially inner side of the rotor core 3 and extend along the axial direction. Particularly, the two groove portions 32b are disposed at positions facing, in the radial direction, adhesive placement positions B1 and B2 on the surface 11 of the permanent magnet 1. The adhesive placement positions B1 and B2 will be discussed later. The two groove portions 32b are provided in the vicinity of both end portions of the magnet hole portion 32 in the circumferential direction. A projecting portion 32c is provided between the two groove portions 32b. The two groove portions 32b each have a bottom portion 32d, and are configured such that a groove depth dl from a top surface 32e of the projecting portion 32c to the bottom portion 32d is larger than a thickness t1 (see FIG. 7) to be discussed later and equal to or less than a thickness t2. The thickness t1 is an example of the "thickness of the adhesive material after being dried" in the claims.

The projecting portion 32c of the rotor core 3 is configured to project from the radially inner side toward the radially outer side of the magnet hole portion 32 at the center portion of the magnet hole portion 32 in the circumferential direction. In general, magnetic saturation is likely to occur at both end portions of the magnet hole portion 32 in the circumferential direction compared to the center portion in the circumferential direction. Thus, the projecting portion 32c is provided at a position corresponding to the center portion of the magnet hole portion 32 in the circumferential direction. Consequently, it is possible to reduce magnetic resistance compared to a case where the projecting portion 32c is not provided and a case where the projecting portion 32c is provided at positions corresponding to both end portions of the magnet hole portion 32 in the circumferential direction. As a result, it is possible to reduce magnetic resistance at a position at which magnetic saturation is comparatively unlikely to occur.

As illustrated in FIG. 3, the adhesive 4 is placed in contact with a part of the surface 11 on the radially inner side of the permanent magnet 1. For example, the adhesive 4 is placed on only a part of the surface 11 on the radially inner side of the permanent magnet 1. Specifically, the adhesive 4 is placed at only the adhesive placement positions B1 and B2 on the surface 11 of the permanent magnet 1.

Particularly, the adhesive 4 is placed at two locations on the surface 11 of the permanent magnet 1, namely the adhesive placement position B1 on one side in the short-length direction (on the side in the direction of the arrow X1) and the adhesive placement position B2 on the other side in the short-length direction (on the side in the direction of the arrow X2). The adhesive 4 is formed so as to have a rectangular shape that extends in the longitudinal direction of the surface 11 of the permanent magnet 1 (in the axial direction from the side in the direction of the arrow Z1 to the side in the direction of the arrow Z2). The adhesive 4 is not placed on axial end surfaces 14 of the permanent magnet 1 or in a portion B3 (on the side in the direction of the arrow Z1) or a portion B4 (on the side in the direction of the arrow Z2) of the surface 11 of the permanent magnet 1 in the vicinity of the axial end surfaces 14.

In the case where the adhesive 4 is placed on the surface 12 on the radially outer side of the permanent magnet 1, the adhesive 4 is placed between the permanent magnet 1 and a stator 102 disposed on the radially outer side of the rotor core 3, which increases the distance between the permanent magnet 1 and the stator 102 by an amount corresponding to the thickness t2 of the adhesive 4. In this respect, in the first embodiment, the adhesive 4 is not placed between the permanent magnet 1 and the stator 102, and thus the distance between the permanent magnet 1 and the stator 102 can be accordingly reduced.

In addition, when the permanent magnet 1 and the rotor core 3 are fixed (bonded) to each other by the adhesive 4 (FIG. 5B), the adhesive 4 contains a foaming agent 41 in a foamed state, and a main agent 42 and a curing agent 43 which are in a cured state. The foaming agent 41 is an example of the "expansive agent" in the claims.

The foaming agent 41 is constituted as an expansive agent that is foamed (expanded) when heated to a temperature that is equal to or higher than an expansion temperature T1. In addition, the main agent 42 and the curing agent 43 have properties of being cured when heated to a temperature that is equal to or higher than a curing temperature T2 which is higher than the expansion temperature T1.

Particularly, the foaming agent 41 is constituted as capsule bodies (see FIG. 6), and configured such that the capsule bodies are expanded to increase volume when the foaming agent 41 is heated to a temperature that is equal to or higher than the expansion temperature T1. For example, the adhesive 4 contains isopentane as the foaming agent 41. In addition, the expansion temperature T1 can be set as a foam molding temperature at which the capsule bodies are foam-molded, for example.

Figure 5:
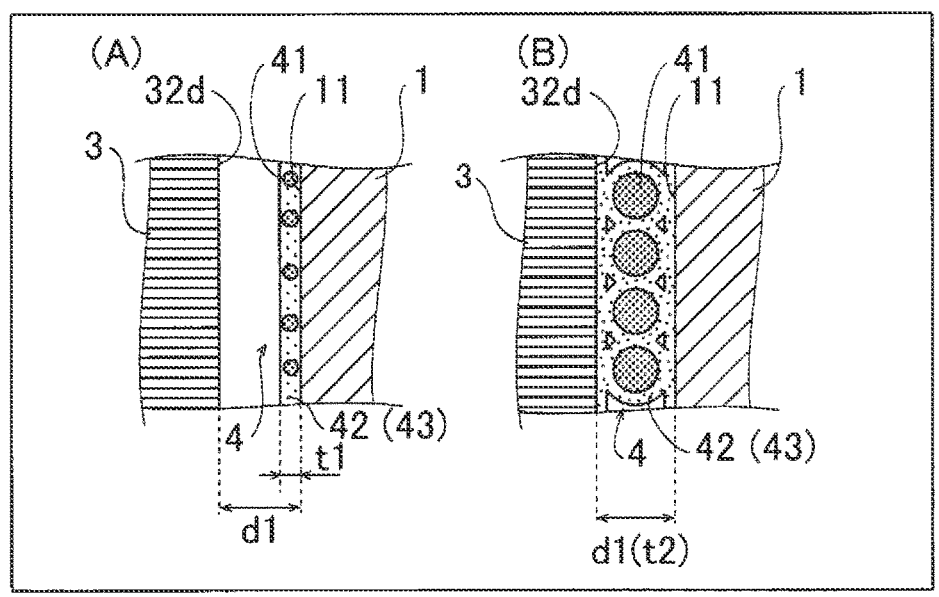
FIG. 5 is a sectional view schematically illustrating a state before and after expansion of the adhesive of the rotor according to the first embodiment of the present disclosure.
Figure 6:
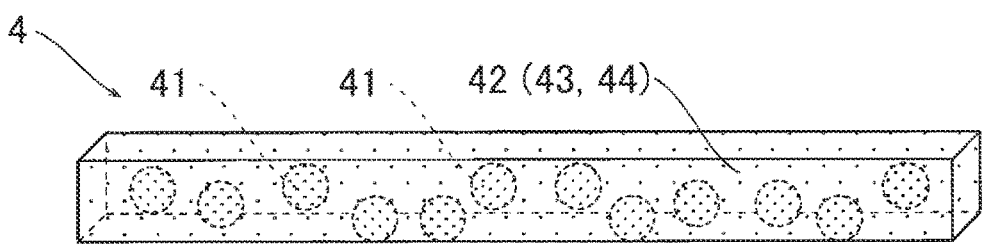
FIG. 6 is a conceptual view illustrating the configuration of the adhesive of the rotor according to the first embodiment of the present disclosure.

As illustrated in FIG. 5, with the foaming agent 41 foamed and expanded, the thickness of the adhesive 4 is varied from the thickness t1 to the thickness t2. As a result, the adhesive 4 is placed to extend from the surface 11 of the permanent magnet 1 to the bottom portion 32d of the groove portion 32b. The foaming agent 41 remains as expanded capsule bodies in the adhesive 4 (in the magnet hole portion 32) also after being heated.

Figure 7:
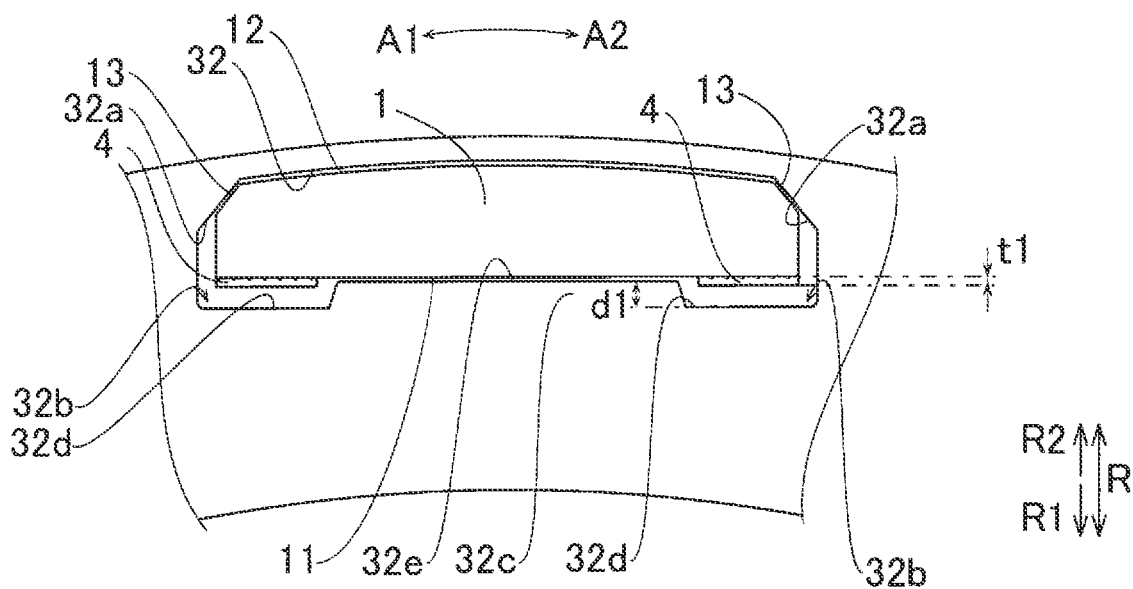
FIG. 7 is a partial plan view illustrating a state in which the permanent magnet is inserted into the rotor core of the rotor according to the first embodiment of the present disclosure.

The proportion of the foaming agent 41 contained in the adhesive 4 is preferably set such that the thickness t1 of the adhesive 4 before the foaming agent 41 is expanded is varied to the thickness t2 which is three times or more to eight times or less the thickness t1 when the foaming agent 41 is foamed and expanded. Before the foaming agent 41 of the adhesive 4 is foamed, as illustrated in FIG. 7, the adhesive 4 and the bottom portions 32d of the groove portions 32b are disposed away from each other, and the surfaces 13 of the permanent magnet 1 and the wall surfaces 32a of the magnet hole portion 32 are disposed away from each other. After the foaming agent 41 of the adhesive 4 is foamed (see FIG. 4), the adhesive 4 is expanded and contacts the bottom portions 32d of the groove portions 32b, the permanent magnet 1 is pressed toward the radially outer side, and the surfaces 13 of the permanent magnet 1 and the wall surfaces 32a of the magnet hole portion 32 are disposed in contact with each other.

The main agent 42 contains an epoxy-based resin (e.g. bisphenol A liquid epoxy and an epoxy resin polymer), for example. Meanwhile, the curing agent 43 contains dicyandiamide, for example. The main agent 42 and the curing agent 43 have properties of being cured when heated to a temperature that is equal to or higher than the curing temperature T2. That is, the adhesive 4 is constituted as a thermosetting adhesive. The permanent magnet 1 and the rotor core 3 are bonded and fixed to each other when the main agent 42 and the curing agent 43 of the adhesive 4 are cured. In addition, the curing temperature T2 is higher than a drying temperature T3 to be discussed later, and higher than the expansion temperature T1. In addition, the curing temperature T2 is set in accordance with the combination of the main agent 42 and the curing agent 43, and is lower than a product upper limit temperature T5. The product upper limit temperature T5 can be set as a temperature that does not affect the performance of the rotor 100, for example.

Figure 8:
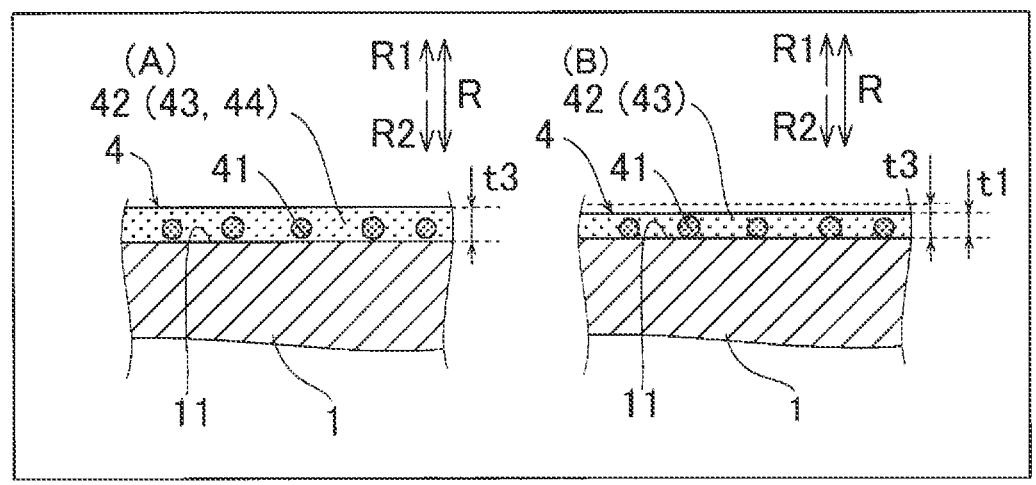
FIG. 8 is a partial sectional view schematically illustrating how the adhesive of the rotor is dried according to the first embodiment of the present disclosure.

In addition, as illustrated in FIG. 8, before the permanent magnet 1 and the rotor core 3 are bonded to each other by the adhesive 4 and before the adhesive 4 is dried, the adhesive 4 contains a dilution solvent 44 that serves as a volatile agent that is volatile, the foaming agent 41 which serves as an expansive agent and which is not foamed yet, and the main agent 42 and the curing agent 43 which are not cured yet.

Before the permanent magnet 1 and the rotor core 3 are fixed to each other by the adhesive 4 and after the adhesive i4 is dried (see FIG. 8B), the adhesive 4 contains the foaming agent 41, and the main agent 42 and the curing agent 43 which are not cured yet. That is, after the adhesive 4 is dried, the amount of the dilution solvent 44 in the adhesive 4 has been decreased, or the dilution solvent 44 is generally not contained in the adhesive 4.

A volatile organic solvent such as ketones such as methyl ethyl ketone, alcohols, and ethers, for example, can be used as the dilution solvent 44. In the first embodiment, the dilution solvent 44 contains both methyl ethyl ketone and ethyl acetate. In addition, the dilution solvent 44 has a lower viscosity than the foaming agent 41 and the curing agent 43. Consequently, the dilution solvent 44, when contained in the adhesive 4, has a function of lowering the viscosity of the adhesive 4 and enhancing flowability.

In addition, the dilution solvent 44 is volatilized when heated to a temperature (e.g. a temperature T10 in FIG. 14) that is equal to or higher than the drying temperature T3. The drying temperature T3 can be set to the boiling temperature of the dilution solvent 44 or a temperature around such a boiling temperature, for example.

The drying temperature T3 is lower than the expansion temperature T1. In addition, the expansion temperature T1 is lower than the curing temperature T2. Consequently, it is possible to volatize the dilution solvent 44 without expanding the foaming agent 41 by setting the temperature of the adhesive 4 to a temperature that is lower than the expansion temperature T1 and that is equal to or higher than the drying temperature T3.

As illustrated in FIG. 8, the adhesive 4 has a thickness t3 in a direction that is perpendicular to the width direction of the permanent magnet 1 (the direction of the arrow R1 and the direction of the arrow R2) before being dried. The adhesive 4 then is decreased in volume to be formed into a thin film when the dilution solvent 44 is volatilized. That is, after being dried, the adhesive 4 has the thickness t1 which is smaller than the thickness t3. The thickness t1 is preferably equal to or less than nine tenths (more preferably, four fifths) of the thickness t3.

[Rotor Manufacturing Method According to First Embodiment]

Figure 13:
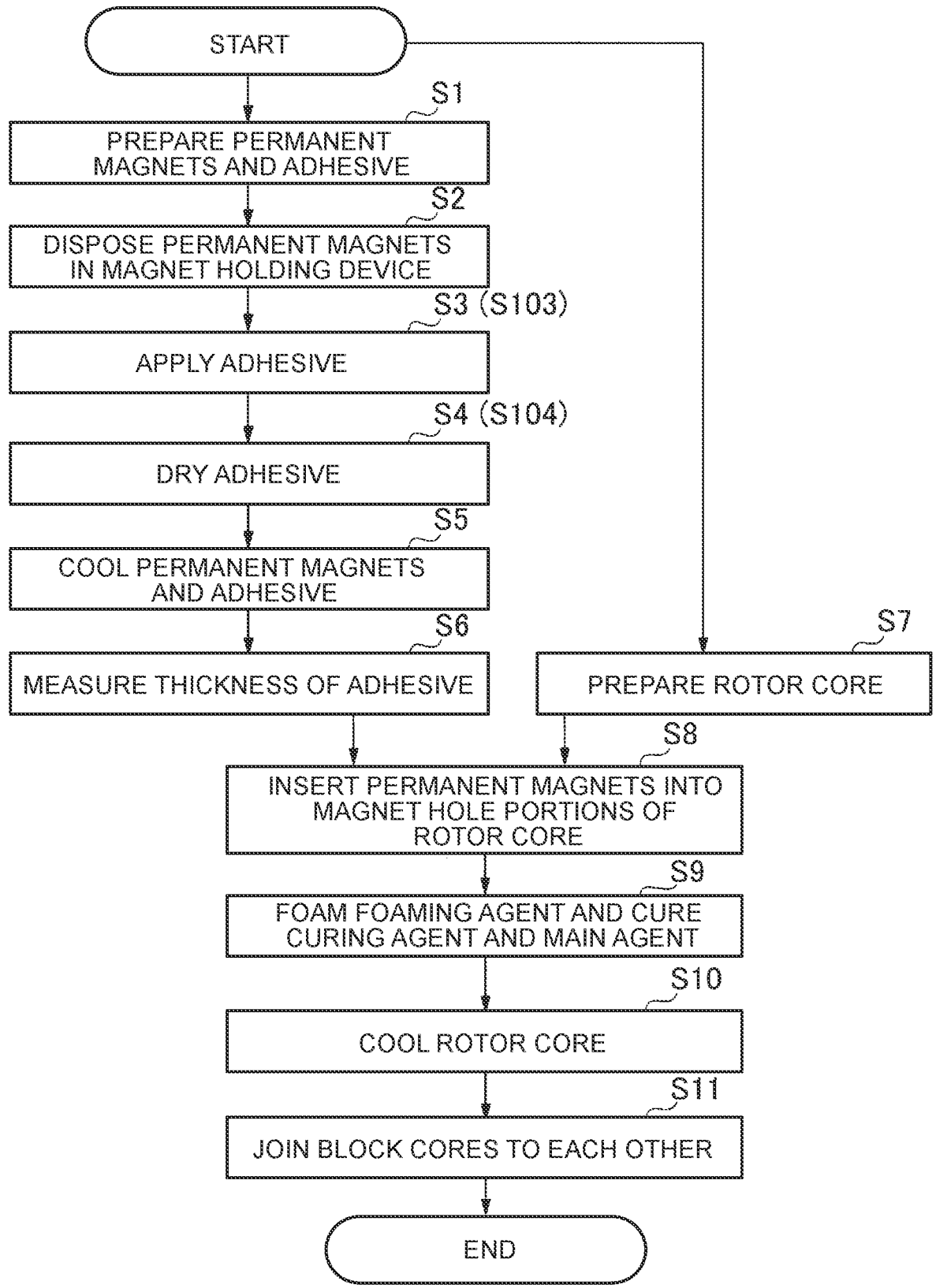
FIG. 13 is a flowchart illustrating a rotor manufacturing process according to the first embodiment and a second embodiment of the present disclosure.
Figure 14:
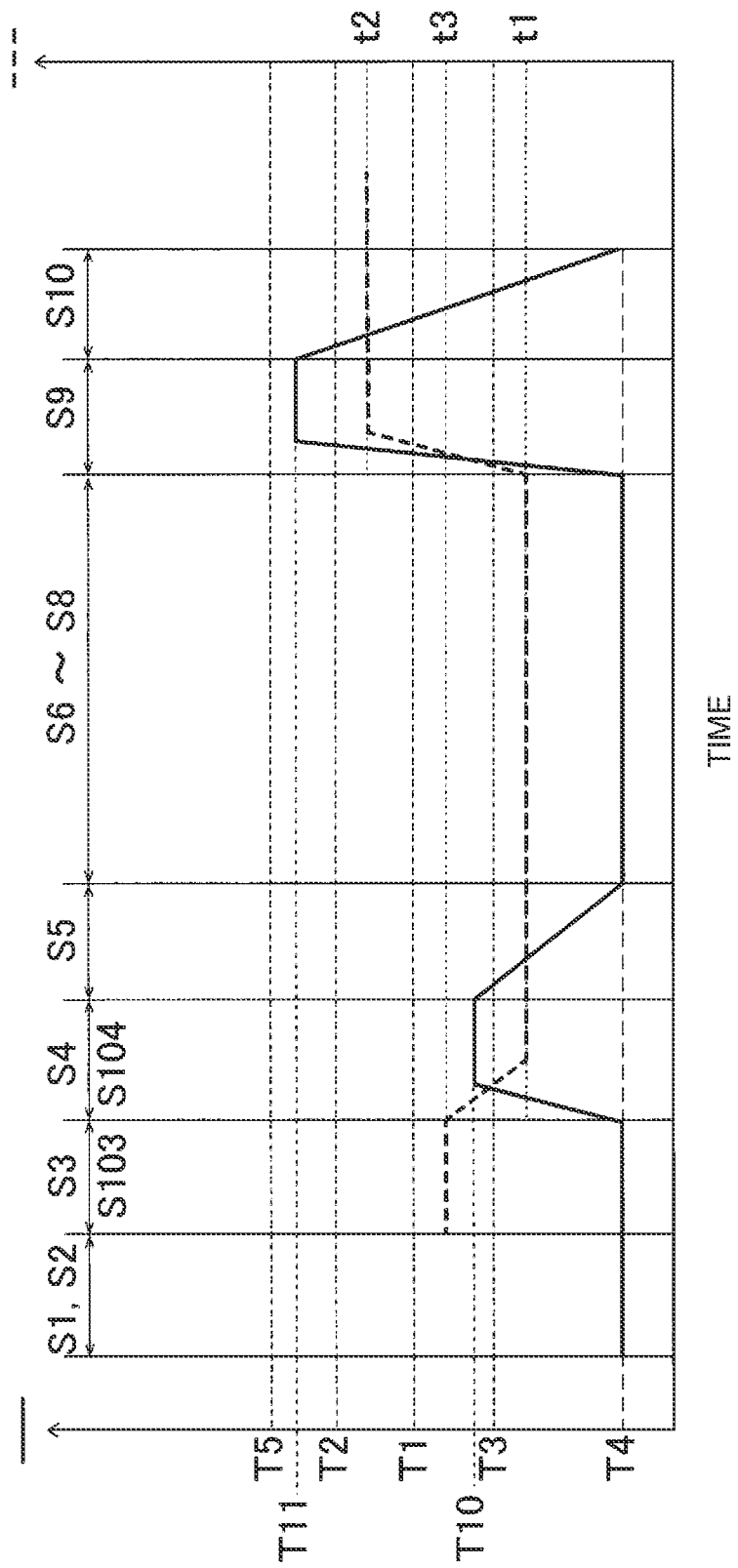
FIG. 14 illustrates the thickness of the adhesive and the temperature of the adhesive during the rotor manufacturing process according to the first embodiment of the present disclosure.

Next, a method of manufacturing the rotor 100 according to the first embodiment will be described with reference to FIGS. 4, 7, and 9 to 14. FIG. 13 is a flowchart of a method of manufacturing the rotor 100 according to the first embodiment. FIG. 14 is a chart illustrating the state of the adhesive 4 during the process of manufacturing the rotor 100 (steps S1 to S10), in which the horizontal axis indicates the time and the vertical axis indicates the temperature (vertical axis on the left side) and the thickness of the adhesive 4 (vertical axis on the right side).

Figure 9:
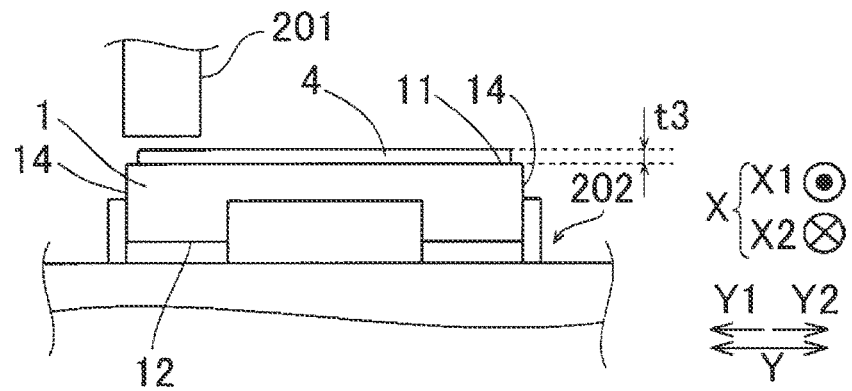
FIG. 9 illustrates a step of applying the adhesive to the permanent magnet of the rotor according to the first embodiment of the present disclosure.

First, in step S1, the permanent magnets 1 and the adhesive 4 are prepared. Particularly, a plurality of permanent magnets 1 including neodymium magnets are prepared. In the first embodiment, the adhesive 4 (see FIG. 7) is prepared. The adhesive 4 contains the foaming agent 41 which serves as an expansive agent that is expanded when heated to a temperature that is equal to or higher than the expansion temperature T1, the dilution solvent 44 which is volatile, and the main agent 42 and the curing agent 43 which are cured when heated to a temperature that is equal to or higher than the curing temperature T2 which is higher than the expansion temperature T1. At this time, in addition, the adhesive 4 in a molten state (in a flowable state) is prepared. For example, the adhesive 4 may be in a liquid state, or in a gel state. As illustrated in FIG. 9, the prepared adhesive 4 is accommodated in an application device 201. After that, the process proceeds to step S2. The prepared permanent magnets 1 are preferably not magnetized yet.

In step S2, as illustrated in FIG. 9, the permanent magnets 1 are attached to a magnet holding device 202. After that, the process proceeds to step S3.

In step S3, the adhesive 4 is applied to the permanent magnets 1 to be placed. Particularly, the adhesive 4 is applied to (placed on) the permanent magnets 1 by moving the application device 201 and the magnet holding device 202 relative to each other while the adhesive 4 is discharged from an opening portion at the distal end of a nozzle of the application device 201. The adhesive 4 which has the thickness t3 is formed. For example, as illustrated in FIG. 3, the adhesive 4 is applied along the Y-axis direction to a portion (adhesive placement position B1) of the surface 11 of each of the permanent magnets 1 on the side in the direction of the arrow X2, and applied along the Y-axis direction to a portion (adhesive placement position B2) of the surface 11 of each of the permanent magnets 1 on the side in the direction of the arrow X1. At this time, the adhesive 4 is not applied to the axial end surfaces 14 of the permanent magnets 1 or the portions B3 and B4 in the vicinity of the axial end surfaces 14. In addition, the adhesive 4 is applied so as to have a rectangular shape as seen from the side in the direction of the arrow Z1 to be placed on the permanent magnets 1. After that, the process proceeds to step S4.

Figure 10:
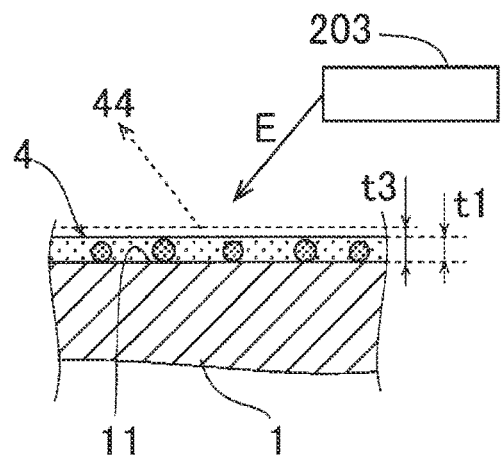
FIG. 10 illustrates how the adhesive of the rotor is dried according to the first embodiment of the present disclosure.

In step S4, the adhesive 4 is dried. In the first embodiment, as illustrated in FIG. 10, by drying the adhesive 4, the thickness of the adhesive 4 is varied to the thickness t1 which is smaller than the thickness t3 of the adhesive 4 before being dried, so that the adhesive 4 is formed into a thin film. By drying the adhesive 4, the viscosity of the adhesive 4 is improved, and the adhesive 4 is positioned at the adhesive placement positions B1 and B2 to be fixed.

Particularly, in the first embodiment, the adhesive 4 is dried by volatilizing the dilution solvent 44 which is contained in the adhesive 4. As indicated in FIG. 14, in addition, the adhesive 4 is dried and the thickness of the adhesive 4 is varied from the thickness t3 to the thickness t1 by heating the adhesive 4 to the temperature T10 which is equal to or higher than the drying temperature T3 and which is lower than the expansion temperature T1. In addition, by volatilizing the dilution solvent 44 which has a comparatively low viscosity, the viscosity of the adhesive 4 is improved, and the adhesive 4 is positioned at the adhesive placement positions B1 and B2 to be fixed.

As illustrated in FIG. 10, in the first embodiment, hot air E (air) that has a temperature (the temperature T10 which is equal to or higher than the drying temperature T3 and which is lower than the expansion temperature T1) that is higher than a room temperature T4 is blown toward the adhesive 4 by an air blower of a drying device 203, so that the dilution solvent 44 which is contained in the adhesive 4 is volatilized. In addition, the dilution solvent 44 which is volatilized is replaced with the hot air E. After that, the process proceeds to step S5.

In step S5, as indicated in FIG. 14, the permanent magnets 1 and the adhesive 4 are cooled. Consequently, the permanent magnets 1 are contracted along the magnetization direction (radial direction of the rotor 100). For example, the permanent magnets 1 and the adhesive 4 are cooled to a temperature around the room temperature T4. After that, the process proceeds to step S6.

In step S6, the thickness of the adhesive 4 is measured. That is, it is checked (inspected) whether the thickness of the adhesive 4 is the desired thickness t1. After that, the process proceeds to step S7.

In step S7, the rotor core 3 is prepared. In the first embodiment, as illustrated in FIG. 7, the magnet hole portion 32 is provided with the groove portions 32b which are provided at positions facing the adhesive placement positions B1 and B2 of each of the permanent magnets 1, which are dented toward the radially inner side of the rotor core 3, and which extend along the axial direction. Specifically, in the first embodiment, the rotor core 3 is prepared so as to have the magnet hole portions 32 each provided with the groove portions 32b which have the groove depth dl which is larger than the thickness t1 of the adhesive 4 which has been dried.

Figure 11:
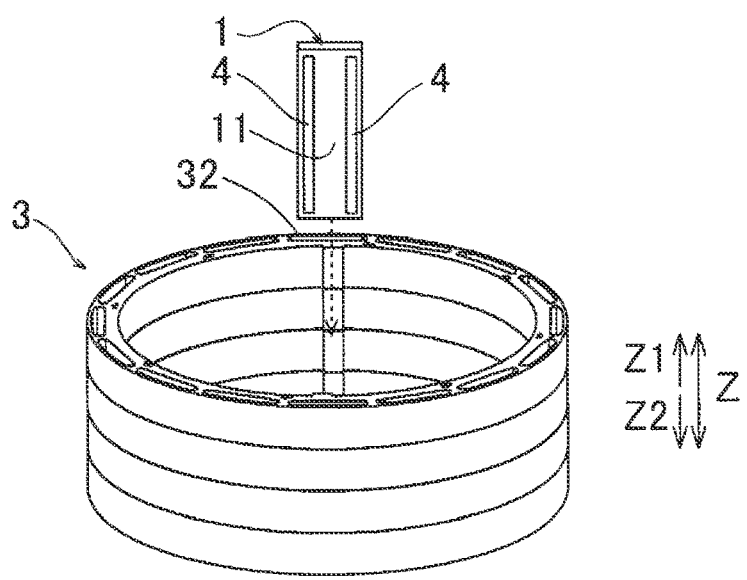
FIG. 11 is a perspective view illustrating a step of inserting the permanent magnet into the rotor core of the rotor according to the first embodiment of the present disclosure.

Particularly, a plurality of electromagnetic steel plates 31 are punched by a progressive pressing device (not illustrated). At this time, a plurality of electromagnetic steel plates 31 in a circular ring shape are formed. In each of the electromagnetic steel plates 31, the hole portions 132 (see FIG. 2) having the groove portions 32b are formed. As illustrated in FIG. 11, the plurality of electromagnetic steel plates 31 are stacked on each other along the axial direction to form a plurality of (e.g. four) core blocks 30. Next, the core blocks 30 are stacked on each other in the axial direction. Some of the plurality of core blocks 30 then are rotated in the circumferential direction or inverted (rotationally built up) with respect to the other core blocks 30. Consequently, the rotor core 3 is formed, and the hole portions 132 of the plurality of core blocks 30 are connected so as to be continuous with each other in the axial direction, thereby forming the magnet hole portions 32. After that, the process proceeds to step S8.

In the first embodiment, in step S8, the permanent magnets 1 on which the dried adhesive 4 is disposed are inserted into the magnet hole portions 32 of the rotor core 3. Specifically, the permanent magnets 1 are inserted into the respective magnet hole portions 32 by moving the rotor core 3 and the permanent magnets 1 relative to each other in the axial direction, with the surfaces 11 on which the adhesive 4 is placed directed toward the radially inner side. Although only one permanent magnet 1 is illustrated in FIG. 11, the permanent magnet 1 is inserted into each of the magnet hole portions 32.

As illustrated in FIG. 7, the bottom portions 32d of the groove portions 32b of the magnet hole portion 32 and the adhesive 4 which has the thickness t1 are disposed away from each other.

Figure 12:
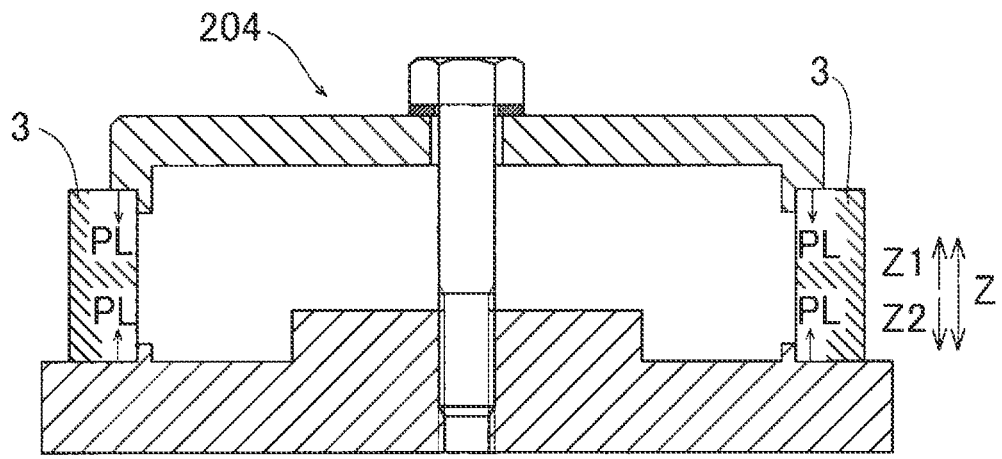
FIG. 12 is a sectional view illustrating a step of curing the adhesive of the rotor according to the first embodiment of the present disclosure.

In step S9, as illustrated in FIG. 12, the permanent magnets 1 and the rotor core 3 are fixed (bonded) to each other by curing the main agent 42 and the curing agent 43 of the adhesive 4. Specifically, the adhesive 4 is heated to a temperature T11 (see FIG. 14) that is higher than the expansion temperature T1 and that is equal to or higher than the curing temperature T2 with the rotor core 3 (and the permanent magnets 1) in which the permanent magnets 1 are disposed pressed (symbol PL) by a pressurizing device 204 from both the side in the direction of the arrow Z1 and the side in the direction or the arrow Z2. For example, the adhesive 4 is heated to the temperature T11 by hot air from an air blower.

Consequently, as illustrated in FIG. 5, the foaming agent 41 of the adhesive 4 is foamed to be expanded, so that the thickness of the adhesive 4 is varied from the thickness t1 to the thickness t2. In addition, the thickness t2 of the adhesive 4 becomes generally equal to the distance from the surface 11 of the permanent magnet 1 to the bottom portions 32d of the groove portions 32b. That is, the adhesive 4 is expanded from the surface 11 of the permanent magnet 1 to the bottom portions 32d of the groove portions 32b. In addition, when the adhesive 4 is expanded, the surfaces 13 of the permanent magnet 1 are pressed toward the radially outer side so that the wall surfaces 32a of the magnet hole portion 32 and the surfaces 13 of the permanent magnet 1 abut against each other.

When the main agent 42 and the curing agent 43 of the adhesive 4 are cured, the permanent magnet 1 and the magnet hole portion 32 are fixed to each other by the adhesive 4 which has been cured. After that, the process proceeds to step S10.

In step S10, as indicated in FIG. 14, the rotor core 3 is cooled. For example, the rotor core 3 is cooled until the temperature of the rotor core 3 and the adhesive 4 is lowered to the room temperature T4. After that, the process proceeds to step S11.

In step S11, the plurality of core blocks 30 are joined to each other by laser welding or the like.

Consequently, manufacture of the rotor 100 is completed. After that, as illustrated in FIG. 1, the rotor 100 is assembled to the stator 102 etc. to complete the manufacture of the rotary electric machine 101.

[Rotor Manufacturing Method According to Second Embodiment]

A method of manufacturing a rotor 300 according to a second embodiment will be described with reference to FIGS. 1, 4, 13, and 15 to 17. Contents that are similar to the structure of and the manufacturing method for the rotor 100 according to the first embodiment are given the same reference numerals or step numbers to omit description.

Figure 15:
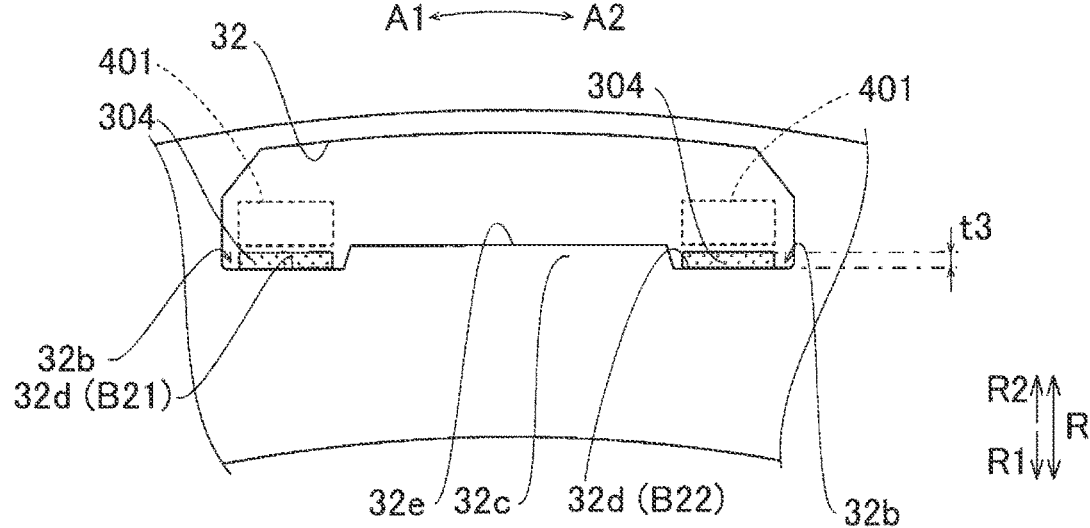
FIG. 15 illustrates a step of applying the adhesive to a magnet hole portion of the rotor core of the rotor according to the second embodiment of the present disclosure.

In the second embodiment, as illustrated in FIG. 13, step S103 is performed, rather than step S3 in the method of manufacturing the rotor 100 according to the first embodiment. That is, as illustrated in FIG. 15, an adhesive 304 is applied to adhesive placement positions B21 and B22 at the bottom portions 32d of the magnet hole portion 32 of the rotor core 3. Specifically, with the distal end portion of a nozzle 401 of an application device inserted into the magnet hole portion 32, the adhesive 304 is applied to the adhesive placement positions B21 and B22 at the bottom portions 32d of the magnet hole portion 32. The bottom portions 32d are an example of the "inner peripheral surface of the magnet hole portion" in the claims.

For example, the adhesive placement positions B21 and B22 are configured similarly to the adhesive placement positions B1 and B2 according to the first embodiment (e.g. in a rectangular shape). That is, the applied adhesive 304 has the thickness t3.

Figure 16:
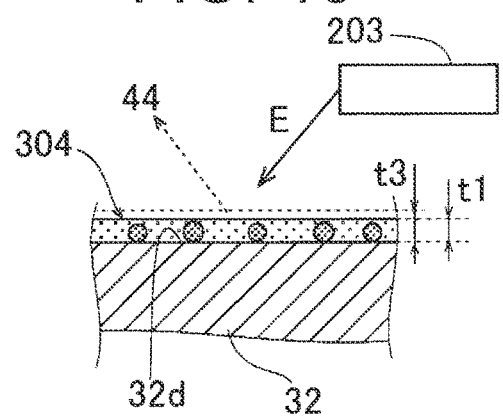
FIG. 16 illustrates a step of drying the adhesive of the rotor according to the second embodiment of the present disclosure.

In the second embodiment, as illustrated in FIG. 13, step S104 is performed, rather than step S4 in the method of manufacturing the rotor 100 according to the first embodiment. That is, as illustrated in FIG. 16, the adhesive 304 is heated to the drying temperature T3 or higher to be dried by the drying device 203. Consequently, the dilution solvent 44 of the adhesive 304 is volatilized, and the thickness of the adhesive 304 is reduced from t3 to t1.

Figure 17:
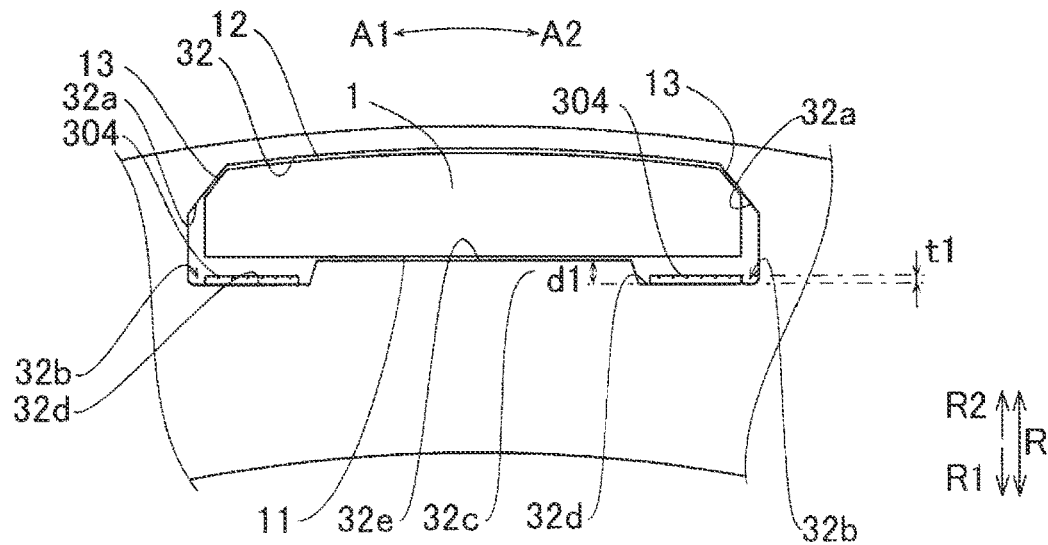
FIG. 17 illustrates a step of inserting the permanent magnet into the magnet hole portion of the rotor core of the rotor according to the second embodiment of the present disclosure.

After that, the manufacturing process is performed in the same manner as in the first embodiment. That is, as illustrated in FIG. 17, the permanent magnets 1 are inserted into the magnet hole portions 32. After that, as illustrated in FIG. 4, the adhesive 304 is heated to the expansion temperature T1 or higher and the curing temperature T2 or higher to expand the foaming agent 41 and cure the main agent 42 and the curing agent 43. Consequently, the thickness of the adhesive 304 is increased to t2, and the permanent magnets 1 and the rotor core 3 are fixed to each other via the cured adhesive 304. After that, as illustrated in FIG. 1, the rotor 300 according to the second embodiment is completed. The method of manufacturing the rotor 300 according to the second embodiment is otherwise the same as that according to the first embodiment.

[Effects of First and Second Embodiments]

The following effects can be obtained with the first and second embodiments.

In the first and second embodiments, as described above, the adhesive 4 (304) can be positioned at the adhesive placement positions B1 and B2 (B21 and B22) to be fixed without using a pressing machine or a mold for molding the adhesive 4 (304). Accordingly, the adhesive 4 (304) can be prevented from adhering to positions other than the adhesive placement positions B1 and B2 (B21 and B22) (e.g. the axial end surfaces 14 and the portions B3 and B4) when the adhesive 4 (304) is fixed to the adhesive placement positions B1 and B2 (B21 and B22). That is, unlike a case where a pressing machine and a mold are used, the adhesive 4 is not exuded out to (leaked into) a position at which the mold and the permanent magnet 1 should abut against each other (a position other than the adhesive placement positions B1 and B2) or a position at which the mold and the rotor core 3 should abut against each other (a position other than the adhesive placement positions B21 and B22), or the adhesive 4 is not exuded out of the mold (e.g. to the portions B3 and B4 on the outer side with respect to the adhesive placement positions B1 and B2) through a gap between the mold and the permanent magnet 1 or the rotor core 3.

In particular, it is necessary that the thin film of the adhesive should be formed so as to be comparatively thin in order to improve insertability, and therefore a portion of the mold corresponding to a position at which the thin film is formed and a portion of the mold corresponding to a position at which the mold and the permanent magnet or the rotor core abut against each other are proximate to each other in the thickness direction of the thin film. Therefore, there is a high possibility that the adhesive which is pressed by the mold is exuded to the outer side with respect to the adhesive placement positions. In this case, for example, the adhesive may be exuded from the axial end surfaces of the rotor core. Also in this respect, the configuration according to the first and second embodiments, which makes it possible to prevent the adhesive 4 (304) from adhering to positions other than the adhesive placement positions B1 and B2 (B21 and B22), is effective.

In addition, when the adhesive 4 (304) is dried, the thickness of the adhesive 4 (304) is reduced from t3 to t1 so that the adhesive 4 (304) is formed into a thin film. Thus, interference between the adhesive 4 and the bottom portion 32d of the magnet hole portion 32 can be prevented, and interference between the adhesive 304 and the outer peripheral surface of the permanent magnet 1 can also be prevented. Consequently, the insertability of the permanent magnet 1 into the magnet hole portion 32 can be improved. In addition, there is no need to prepare a pressing machine and a mold (dedicated mold) for molding an adhesive, which can accordingly prevent complication of manufacturing equipment for manufacturing the rotor 100 (300). In addition, the adhesive 4 (304) is applied to the permanent magnet 1 or the rotor core 3. Thus, unlike a case where an adhesive sheet is used, a step of forming an adhesive sheet is not required, which can prevent an increase in the number of steps of the method of manufacturing the rotor 100 (300), and can prevent it from becoming difficult to place the adhesive 4 (304) on the permanent magnet 1 or the rotor core 3.

In the first and second embodiments, in addition, the step of drying the adhesive 4 (304) is a step of drying the adhesive 4 (304) by volatilizing the dilution solvent 44 which is contained in the adhesive 4 (304). Consequently, the adhesive 4 (304) can be dried easily by volatilizing the dilution solvent 44. In addition, by lowering the viscosity of the dilution solvent 44, preferably, the viscosity of the adhesive 4 (304) before being dried, which contains the dilution solvent 44, can be lowered (the flowability thereof can be enhanced), and the viscosity of the adhesive 4 (304) after being dried, from which the dilution solvent 44 has been volatilized, can be improved (the flowability thereof can be lowered). As a result, the adhesive 4 (304) before being dried, which has a comparatively high flowability, can be easily applied to the permanent magnet 1, and the adhesive 4 (304) can be fixed to the adhesive placement positions B1 and B2 (B21 and B22) since the adhesive 4 (304) after being dried has a comparatively low flowability. Consequently, the adhesive 4 can be prevented from being peeled off from the adhesive placement positions B1 and B2 (B21 and B22) even in the case where the shape of the adhesive 4 (304) after being dried is lost or the adhesive 4 (304) contacts the rotor core 3 or the permanent magnet 1.

In the first and second embodiments, in addition, the step of drying the adhesive 4 (304) is a step of drying the adhesive 4 (304) by heating the adhesive 4 (304) to the temperature T10 which is equal to or higher than the drying temperature T3 and which is lower than the expansion temperature T1. Consequently, the adhesive 4 (304) can be dried by being heated without expanding the foaming agent 41.

In the first embodiment, in addition, the step of applying the adhesive 4 is a step of applying the adhesive 4 to the adhesive placement positions B1 and B2 on the surface 11 of the permanent magnet 1. Consequently, unlike a case where the adhesive 4 is applied to the rotor core 3, heat applied when the adhesive 4 is dried is not absorbed by the rotor core 3, but absorbed by only the permanent magnet 1 which is smaller in volume than the rotor core 3. Thus, the adhesive 4 can be dried rapidly because the temperature of the entire adhesive 4 is raised comparatively rapidly. In addition, the adhesive 4 is applied to the surface 11 (outer peripheral surface) of the permanent magnet 1. Thus, the configuration of the application device 201 can be simplified compared to a case where the adhesive 4 is applied to the inner peripheral surface of the magnet hole portion 32 of the rotor core 3.

In the first and second embodiments, in addition, the step of fixing the permanent magnet 1 and the rotor core 3 to each other using the adhesive 4 (304) is a step of fixing the permanent magnet 1 and the rotor core 3 to each other by curing the main agent 42 and the curing agent 43 which are contained in the adhesive 4 (304) by heating the adhesive 4 (304) to a temperature that is equal to or higher than the curing temperature T2 which is higher than the expansion temperature T1. Consequently, the permanent magnet 1 and the rotor core 3 can be fixed to each other with the foaming agent 41 expanded and with the main agent 42 and the curing agent 43 cured easily by heating the adhesive 4 (304), which has been dried and formed into a thin film, to the temperature T11 which is equal to or higher than the curing temperature T2 which is higher than the expansion temperature T1.

In the first and second embodiments, in addition, the step of drying the adhesive 4 (304) is a step of drying the adhesive 4 (304) using the hot air E which has the temperature T10 which is higher than the room temperature T4. In the case where the adhesive 4 (304) is heated and dried by a heater, rather than using the hot air E, it is necessary to replace a solvent if a part of the adhesive 4 (304) that has been volatilized is a flammable solvent. That is, a component for ventilation is required separately from the heater. With focus on this respect, since the step of drying the adhesive 4 (304) is a step of drying the adhesive 4 (304) using the hot air E which has the temperature T10 which is higher than the room temperature T4 in the first and second embodiments, a part (dilution solvent 44) of the adhesive 4 (304) that has been volatilized can be replaced with the hot air E while the adhesive 4 (304) is heated and dried. As a result, there is no need to separately prepare a component for drying the adhesive 4 (304) and a component for ventilation, which accordingly prevents further complication of the manufacturing equipment for the rotor 100 (300).

In the first and second embodiments, in addition, the adhesive 4 (304) is configured to contain the dilution solvent 44 which serves as a volatile agent that is volatile, the foaming agent 41 which serves as an expansive agent, and the main agent 42 and the curing agent 43 which are cured when heated to a temperature that is equal to or higher than the curing temperature T2 which is equal to or higher than the expansion temperature T1. Consequently, the adhesive 4 (304) can be dried and formed into a thin film easily by volatilizing the dilution solvent 44 which is contained in the adhesive 4 (304), the adhesive 4 (304) can be expanded by foaming the foaming agent 41 which is contained in the adhesive 4 (304), and the permanent magnet 1 and the rotor core 3 can be fixed to each other by curing the main agent 42 and the curing agent 43 which are contained in the adhesive 4 (304).

In the first and second embodiments, in addition, each of the magnet hole portions 32 of the rotor core 3 is provided with the groove portions 32b, which are provided at positions facing the adhesive placement positions B1 and B2 of the permanent magnet 1 (or the adhesive placement positions B21 and B22) and which are dented toward the radially inner side of the rotor core 3 (extend along the axial direction). In addition, the groove portions 32b are configured to have the groove depth dl which is larger than the thickness t1. Consequently, due to the groove depth dl of the groove portions 32b being larger than the thickness t1 of the adhesive 4 (304), interference between the wall surfaces (the bottom portions 32d of the groove portions 32b) of the magnet hole portion 32 and the adhesive 4 (304) can be prevented when the permanent magnet 1 is inserted into the rotor core 3 such that the adhesive 4 (304) which has been dried and has the thickness t1 is placed in the groove portions 32b.

[Modifications]

The embodiments disclosed herein should be considered as exemplary and non-limiting in all respects. The scope of the present disclosure is defined by the scope of the claims, rather than the description of the embodiments described above, and includes all changes (modifications) that fall within the scope of the claims and the meaning and scope of equivalence.

For example, in the first and second embodiments described above, the rotor 100 (300) is constituted as a so-called inner rotor which is disposed on the radially inner side of the stator 102. However, the present disclosure is not limited thereto. That is, the rotor 100 (300) may be constituted as an outer rotor.

In the first and second embodiments described above, in addition, the foaming agent 41 is used as the expansive agent. However, the present disclosure is not limited thereto. For example, a material that is expanded by being heated other than the foaming agent 41 may be used as the expansive agent.

In the first and second embodiments described above, in addition, the curing temperature T2 is a temperature that is higher than the expansion temperature T1. However, the present disclosure is not limited thereto. For example, the curing temperature T2 may be a temperature that is equal to the expansion temperature T1. It is only necessary that the curing temperature T2 should be equal to or higher than the expansion temperature T1.

In the first and second embodiments described above, in addition, the adhesive 4 is applied to the permanent magnet 1 or the rotor core 3 using the nozzle of the application device 201 (see FIG. 9 or FIG. 15). However, the present disclosure is not limited thereto. For example, the adhesive 4 may be applied to the permanent magnet 1 or the rotor core 3 by a different method such as stamping.

In the first and second embodiments described above, in addition, the adhesive 4 is dried by the hot air E (see FIG. 10). However, the present disclosure is not limited thereto. For example, the adhesive 4 may be dried by being heated by a heater if a manufacturing device for the rotor 100 (300) is further provided with a ventilation device.

In the first embodiment described above, in addition, the adhesive 4 is applied to (placed at) only the adhesive placement positions B1 and B2 on the surface 11 of the permanent magnet 1. However, the present disclosure is not limited thereto. For example, the adhesive 4 may be applied to (placed at) adhesive placement positions other than the adhesive placement positions B1 and B2 on the surface 11 of the permanent magnet 1. That is, the adhesive 4 may be applied to (placed at) an adhesive placement position provided at any desired position on a side surface (e.g. the surface 11, the surface 12, or both the surface 11 and the surface 12) of the permanent magnet 1 that faces the magnet hole portion 32 other than the axial end surfaces 14.

In the first and second embodiments described above, in addition, the manufacturing methods illustrated in the flowcharts of FIGS. 13 and 17 are described. However, the present disclosure is not limited thereto. For example, the rotor 100 (300) may be manufactured by a method of manufacturing the rotor 100 (300) according to a modification illustrated in the flowchart of FIG. 18. That is, the method of manufacturing the rotor 100 (300) according to the modification is not provided with steps S2, S5, S6, S10, and S11, unlike those according to the first and second embodiments described above.

Figure 18:
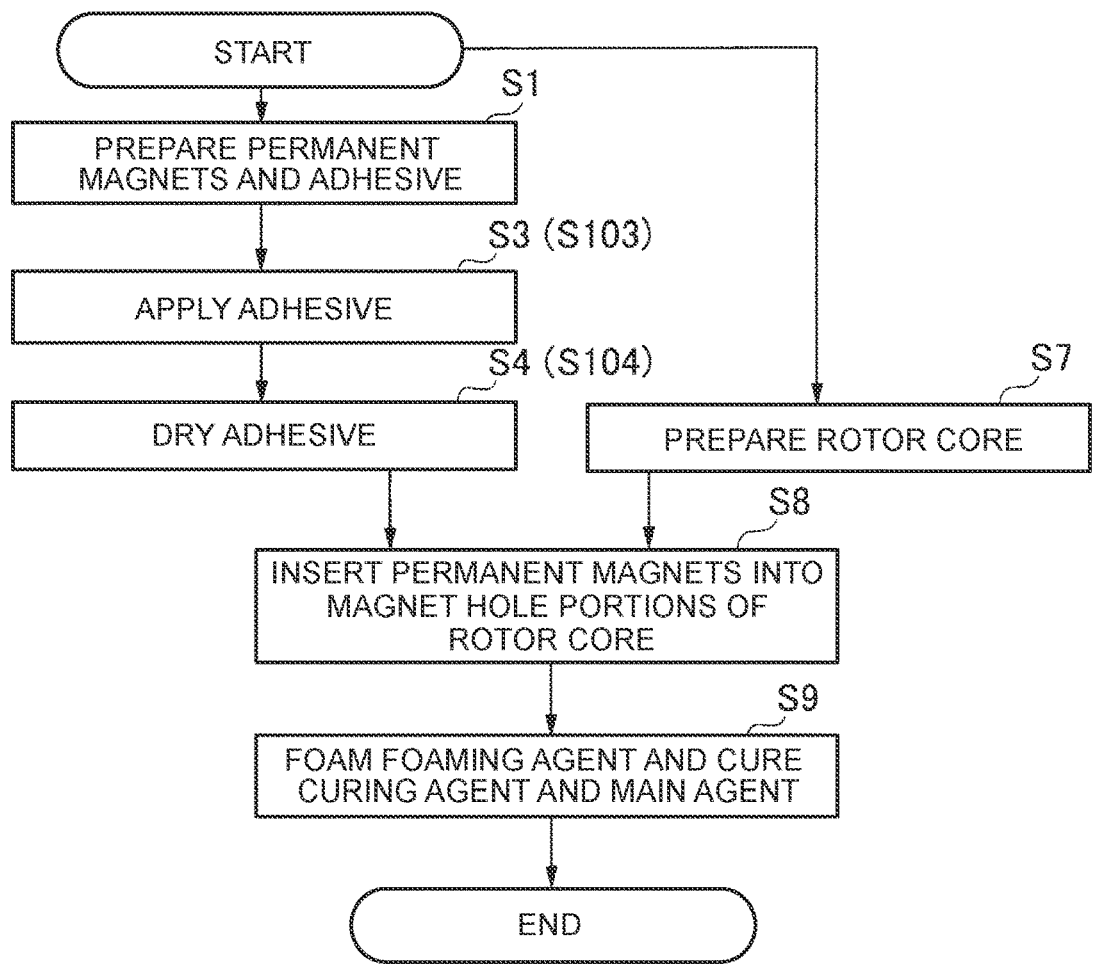
FIG. 18 is a flowchart illustrating the rotor manufacturing process according to a modification of the first embodiment or the second embodiment of the present disclosure.
Figure 19:
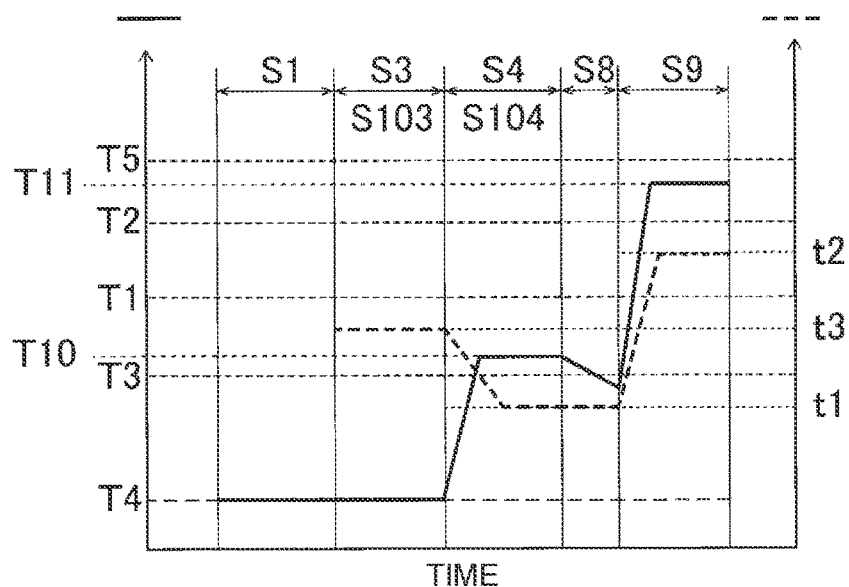
FIG. 19 illustrates the thickness of the adhesive and the temperature of the adhesive during the rotor manufacturing process according to the modification of the first embodiment or the second embodiment of the present disclosure.

In the method of manufacturing the rotor 100 (300) according to the modification, as illustrated in FIGS. 18 and 19, the permanent magnets 1 and the adhesive 4 are prepared (step S1), and thereafter the adhesive 4 is applied to the permanent magnets 1 or the magnet hole portions 32 of the rotor core 3 (step S3 or step S103).

In the method of manufacturing the rotor 100 (300) according to the modification, in addition, the adhesive 4 (304) is dried (step S4 or step S104), and thereafter the permanent magnets 1 are inserted into the magnet hole portions 32 of the rotor core 3 (step S8). That is, step S8 is performed in a state in which the adhesive 4 (304) is not actively cooled (a state before the temperature of the adhesive 4 (304) is lowered to the room temperature T4).

In the case where the adhesive 4 is applied to the permanent magnets 1 and the permanent magnets 1 include neodymium magnets, the permanent magnets 1 have a negative coefficient of thermal expansion in a direction that is perpendicular to the magnetization direction. In this case, the permanent magnets 1 are contracted in a direction that is perpendicular to the magnetization direction of the permanent magnets 1 (the width direction and the axial direction of the permanent magnets 1) because the adhesive 4 is not cooled. Thus, in the case where a gap between the magnet hole portions 32 and the permanent magnets 1 is comparatively small in the width direction and the axial direction of the permanent magnets 1, insertability can be improved by inserting the permanent magnets 1 into the magnet hole portions 32 in a state in which the adhesive 4 is not cooled.

The invention claimed is:

1. A method of manufacturing a rotor that includes a rotor core having a magnet hole, and a permanent magnet inserted into the magnet hole and fixed to the rotor core using an adhesive, the method comprising:

applying the adhesive to an adhesive placement position on an outer peripheral surface of the permanent magnet or an inner peripheral surface of the magnet hole, the adhesive containing an expansive agent that is expanded by being heated to a temperature that is equal to or higher than an expansion temperature;

drying the adhesive after applying the adhesive;

inserting the permanent magnet into the magnet hole of the rotor core after drying the adhesive; and fixing the permanent magnet and the rotor core to each other using the adhesive by expanding the expansive agent and curing the adhesive by heating the adhesive to a temperature that is equal to or higher than the expansion temperature after inserting the permanent magnet.

2. The method of manufacturing a rotor according to claim 1, wherein drying the adhesive includes drying the adhesive by volatilizing a volatile agent contained in the adhesive.

3. The method of manufacturing a rotor according to claim 1, wherein drying the adhesive includes drying the adhesive by heating the adhesive to a temperature that is equal to or higher than a drying temperature and that is lower than the expansion temperature.

4. The method of manufacturing a rotor according to claim 2, wherein drying the adhesive includes drying the adhesive by heating the adhesive to a temperature that is equal to or higher than a drying temperature and that is lower than the expansion temperature.

5. The method of manufacturing a rotor according to claim 3, wherein
applying the adhesive includes applying the adhesive to the adhesive placement position on the outer peripheral surface of the permanent magnet.

6. The method of manufacturing a rotor according to claim 4, wherein
applying the adhesive includes applying the adhesive to the adhesive placement position on the outer peripheral surface of the permanent magnet.

7. The method of manufacturing a rotor according to claim 1, wherein
fixing the permanent magnet and the rotor core to each other includes fixing the permanent magnet and the rotor core to each other by curing a main agent and a curing agent contained in the adhesive by heating the adhesive to a temperature that is equal to or higher than a curing temperature that is equal to or higher than the expansion temperature.

8. The method of manufacturing a rotor according to claim 2, wherein
fixing the permanent magnet and the rotor core to each other includes fixing the permanent magnet and the rotor core to each other by curing a main agent and a curing agent contained in the adhesive by heating the adhesive to a temperature that is equal to or higher than a curing temperature that is equal to or higher than the expansion temperature.

9. The method of manufacturing a rotor according to claim 3, wherein
fixing the permanent magnet and the rotor core to each other includes fixing the permanent magnet and the rotor core to each other by curing a main agent and a curing agent contained in the adhesive by heating the adhesive to a temperature that is equal to or higher than a curing temperature that is equal to or higher than the expansion temperature.

10. The method of manufacturing a rotor according to claim 4, wherein
fixing the permanent magnet and the rotor core to each other includes fixing the permanent magnet and the rotor core to each other by curing a main agent and a curing agent contained in the adhesive by heating the adhesive to a temperature that is equal to or higher than a curing temperature that is equal to or higher than the expansion temperature.

11. The method of manufacturing a rotor according to claim 5, wherein
fixing the permanent magnet and the rotor core to each other includes fixing the permanent magnet and the rotor core to each other by curing a main agent and a curing agent contained in the adhesive by heating the adhesive to a temperature that is equal to or higher than a curing temperature that is equal to or higher than the expansion temperature.

12. The method of manufacturing a rotor according to claim 6, wherein
fixing the permanent magnet and the rotor core to each other includes fixing the permanent magnet and the rotor core to each other by curing a main agent and a curing agent contained in the adhesive by heating the adhesive to a temperature that is equal to or higher than a curing temperature that is equal to or higher than the expansion temperature.

13. The method of manufacturing a rotor according to claim 1, wherein
drying the adhesive includes drying the adhesive using hot air that has a temperature that is higher than a room temperature.

14. The method of manufacturing a rotor according to claim 1, wherein
the adhesive contains a dilution solvent that serves as a volatile agent that is volatile, a foaming agent that serves as the expansive agent, and a main agent and a curing agent that are cured by being heated to a temperature that is equal to or higher than a curing temperature that is equal to or higher than the expansion temperature.

15. The method of manufacturing a rotor according to claim 2, wherein
the adhesive contains a dilution solvent that serves as a volatile agent that is volatile, a foaming agent that serves as the expansive agent, and a main agent and a curing agent that are cured by being heated to a temperature that is equal to or higher than a curing temperature that is equal to or higher than the expansion temperature.

16. The method of manufacturing a rotor according to claim 3, wherein
the adhesive contains a dilution solvent that serves as a volatile agent that is volatile, a foaming agent that serves as the expansive agent, and a main agent and a curing agent that are cured by being heated to a temperature that is equal to or higher than a curing temperature that is equal to or higher than the expansion temperature.

17. The method of manufacturing a rotor according to claim 4, wherein
the adhesive contains a dilution solvent that serves as a volatile agent that is volatile, a foaming agent that serves as the expansive agent, and a main agent and a curing agent that are cured by being heated to a temperature that is equal to or higher than a curing temperature that is equal to or higher than the expansion temperature.

18. The method of manufacturing a rotor according to claim 5, wherein
the adhesive contains a dilution solvent that serves as a volatile agent that is volatile, a foaming agent that serves as the expansive agent, and a main agent and a curing agent that are cured by being heated to a temperature that is equal to or higher than a curing temperature that is equal to or higher than the expansion temperature.

19. The method of manufacturing a rotor according to claim 6, wherein
the adhesive contains a dilution solvent that serves as a volatile agent that is volatile, a foaming agent that serves as the expansive agent, and a main agent and a curing agent that are cured by being heated to a temperature that is equal to or higher than a curing temperature that is equal to or higher than the expansion temperature.

20. The method of manufacturing a rotor according to claim 1, wherein:
the magnet hole of the rotor core is provided with a groove that is dented toward a radially inner side of the rotor core, the groove being provided at a position facing the adhesive placement position of the permanent magnet or at the adhesive placement position of the magnet hole; and the groove has a groove depth that is larger than a thickness of the adhesive after being dried.

* * * * *